United States Patent
Baptist

(10) Patent No.: US 6,233,309 B1
(45) Date of Patent: May 15, 2001

(54) SYSTEM FOR RECORDING INFORMATION ON A MEDIUM SENSITIVE TO X-RAYS

(75) Inventor: Robert Baptist, Jarrie (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/291,941

(22) Filed: Apr. 15, 1999

(30) Foreign Application Priority Data

May 12, 1998 (FR) .................................. 98 05958

(51) Int. Cl.[7] ......................................... H05G 1/70
(52) U.S. Cl. ............................... 378/92; 378/162
(58) Field of Search ...................... 378/92, 162, 165, 378/166, 169, 163, 164, 93

(56) References Cited

U.S. PATENT DOCUMENTS

| | | |
|---|---|---|
| 3,845,314 | 10/1974 | Byler et al. . |
| 4,860,330 | 8/1989 | Strommer et al. . |
| 5,676,818 | * 10/1997 | Delapierre et al. ............... 205/664 |
| 5,836,796 | * 11/1998 | Danroc ............................... 445/24 |

FOREIGN PATENT DOCUMENTS 0 474 552 A1 * 9/1991 (FR) .

OTHER PUBLICATIONS

Patent Abstracts of Japan, vol. 007, No. 127 (P–201), Jun. 3, 1983 & JP 58 043448 A (Tokyo Shibaura Denki KK), Mar. 14, 1983.

* cited by examiner

*Primary Examiner*—Robert H. Kim
*Assistant Examiner*—Irakli Kiknadze
(74) *Attorney, Agent, or Firm*—Burns Doane Swecker & Mathis LLP

(57) ABSTRACT

A system for recording information on a film medium sensitive to X-rays, without disturbing the radiographic image previously recorded on the same film. The system includes a set of adjacent X-rays sources and a source control which sequentially controls the X-rays emitted by each source. Different printing levels on the medium are obtained by controlling X-ray output dosage by each source.

13 Claims, 2 Drawing Sheets

SYSTEM FOR RECORDING INFORMATION ON A MEDIUM SENSITIVE TO X-RAYS

TECHNICAL DOMAIN

This invention relates to a system for recording information on a medium sensitive to X-rays. Applications of the invention are particularly in the medical fields of radiology and tomography, to add information such as data about the patient, information about conditions under which the radiology examination is carried out, or radiography instrument identification numbers, onto the radiographs of patients. The invention may also be used in other fields of application such as X-ray grating spectrography and fluorescence, for example to add data concerning the samples being treated to the records.

STATE OF PRIOR ART

Archiving and analysis of X-ray media, and particularly radiology films, is made very much easier if the film is accompanied by a certain number of data, for example such as the patient's name. These data may be entered on a label which can be glued onto the film, or may be written on the film directly by means of special inks developed with the film. Very simple data can also be recorded on the film using a code based on small perforations made in the film.

However, manipulating labels or film can be the source of human errors. Labels could be glued on a film to which they do not correspond, and text written on the film directly using special inks could become illegible if the film is overexposed.

Thus, techniques have been developed for recording information directly on the film, to avoid analysis or archiving errors. These techniques are described below.

Radiography films usually used for medical applications are films sensitive to visible light and are placed in an envelope of a luminescent material capable of converting X-radiation into visible radiation. This material can also make the film sensitive to X-rays in order to record radiographic images of patients.

To facilitate its manipulation, the film is placed inside an envelope opaque to visible light but transparent to X-rays.

There are several known techniques for adding patient identification information to the sensitive film.

According to a first technique, the film envelope is opened in safe light (in a dark room) and the film is placed under a device which will print on the undeveloped film and add information. Information is marked on the film by illuminating part of this film with visible light that passes through a label containing the information to be recorded.

One of the main difficulties when using this type of device is to avoid concealing the complementary part of the film on which the radiographic record has been or will be received.

Consequently, the film envelope may be a cassette containing a system of removable optical caches. These caches may be moved to expose a window so that only a portion of the film is illuminated, when transferring information.

According to a second technique, the information may be transferred onto the film by exposing it to a very fine light beam from a laser. This laser is moved parallel to the film surface to write characters or codes on the film. This operation is also carried out in a dark room, or by using a specially adapted opaque cassette.

According to one variant, the recording on the undeveloped film may also be made by applying an illuminated liquid crystal display (LCD) screen, or a vacuum fluorescent display (VFD) screen, to it.

In all these applications, it is observed that it is important to very carefully isolate the part of the film that will receive information from the part of the film that will receive the radiographic image. Light produced by information recording equipment and particularly ambient light can "pollute" or conceal all or part of the film.

According to a third technique, transfer elements in the form of letters and containing a material absorbing X-rays are used to write information on the film. Transfer elements are placed on the film envelope (opaque to visible light) and are subjected to X-radiation. This radiation may originate from the X-ray tube used for the radiography of the patient or another type of secondary X-ray tube.

In this case also, the transfer elements are used with a system of removable caches.

Document EP-A-0 238 464 also illustrates other processes using similar techniques for marking films sensitive to X-rays.

There are implementation difficulties with all the techniques mentioned above, related particularly to the need to optically isolate the part of the film on which the information will be received.

Parasite reflections of visible or infrared light could disturb the radiographic image on the film.

Furthermore, the processes described above are only suitable for simple reproduction of alphabetic or numeric characters, but cannot be used for the fine reproduction of various shades of gray. Therefore these processes are not suitable for transferring other information such as images or personalized icons onto the film.

DESCRIPTION OF THE INVENTION

The purpose of this invention is to propose a system for recording information on a sensitive medium that does not have the difficulties or limitations mentioned above.

One particular purpose of the invention is to propose such a system for recording information on a film without disturbing the radiographic image already recorded on the film, or that will be recorded later.

Another purpose is to be able to directly record data previously input to the computer, or stored on the computer, onto the film.

Another purpose of the invention is to record images or logos displayed in different shades of gray.

Finally, another purpose is to provide a device capable of guaranteeing good contrast of information marked on the film.

In order to achieve these purposes, the purpose of the invention is more precisely a system for recording information on a medium sensitive to X-rays, comprising a set of adjacent X-ray sources and selective source control means, to print a selected pattern on the said sensitive medium.

Sources are controlled concomitantly or sequentially to selectively provoke or not provoke emission of X-rays by each source. The intensity or the X-ray dose output by each source can also be varied to obtain different printing levels on the medium. These levels correspond to shades of gray in the case of a radiographic film.

According to a particular embodiment of the system, the system may comprise a single dimensional or a two-dimensional network of point X-ray sources.

A point source is a source that emits on a very small surface on an image, that can be treated like a point. A network of point sources can thus be used to reproduce a text or an image by placing points or image elements called pixels adjacent to each other.

For example, X-ray sources may be made in the form of microtip sources. These sources can form miniaturized inscription matrices with a large number of sources.

This type of matrix can be used to reproduce images with a good resolution and a large number of pixels.

More precisely, each X-ray source may comprise at least one source of electrons with microtips. Electron sources are associated with one or several anodes capable of emitting X-rays in response to electron impacts.

Each electron source may be associated with a particular anode. However, a set of sources may also share a common anode.

According to a first means of polarizing X-ray sources, the anode may be connected to a ground potential and control means may comprise switches associated with electron sources to selectively connect the microtips from the selected electron sources to a high negative voltage, and/or to power supplies designed to generate electron beams.

According to this polarization method, the switches are at a high voltage.

Control means may also comprise a control unit such as a computer to control the switches and/or power supplies.

The switches and/or power supplies may be connected to the computer through a galvanic isolation device in order to make it impossible for the computer to be at the same potential as the switches and/or power supplies.

According to another polarization option, the anode may be connected to a high positive voltage and the control means switches and/or the power supplies may be controlled so as to selectively connect the microtips on the selected sources to a ground potential, and/or to generate more or less intense electron beams starting from the selected cathodes.

According to another advantageous aspect of the invention, the system may comprise an envelope opaque to visible light, capable of containing the radiography film, and a cache opaque to X-rays that can be adapted to the box to cover a region of the envelope. This region corresponds to an area on which information is recorded on the film.

The cache opaque to X-rays is held in place on the envelope while the sensitive medium, for example a film contained in the envelope, is exposed to the X-rays in a radiography instrument. Thus, X-rays from the radiography do not expose the area set aside for recording of information. The cache can then be removed from the envelope later to print on the film in the said information recording area, using the X-ray sources described above. This gives an improved contrast for the recording.

Other characteristics and advantages of this invention will become clearer from the following description with reference to the figures in the attached drawings. This description is given for illustrative purposes only and it is in no way restrictive.

DETAILED DESCRIPTION OF EMBODIMENTS OF THE INVENTION

Figure 1:
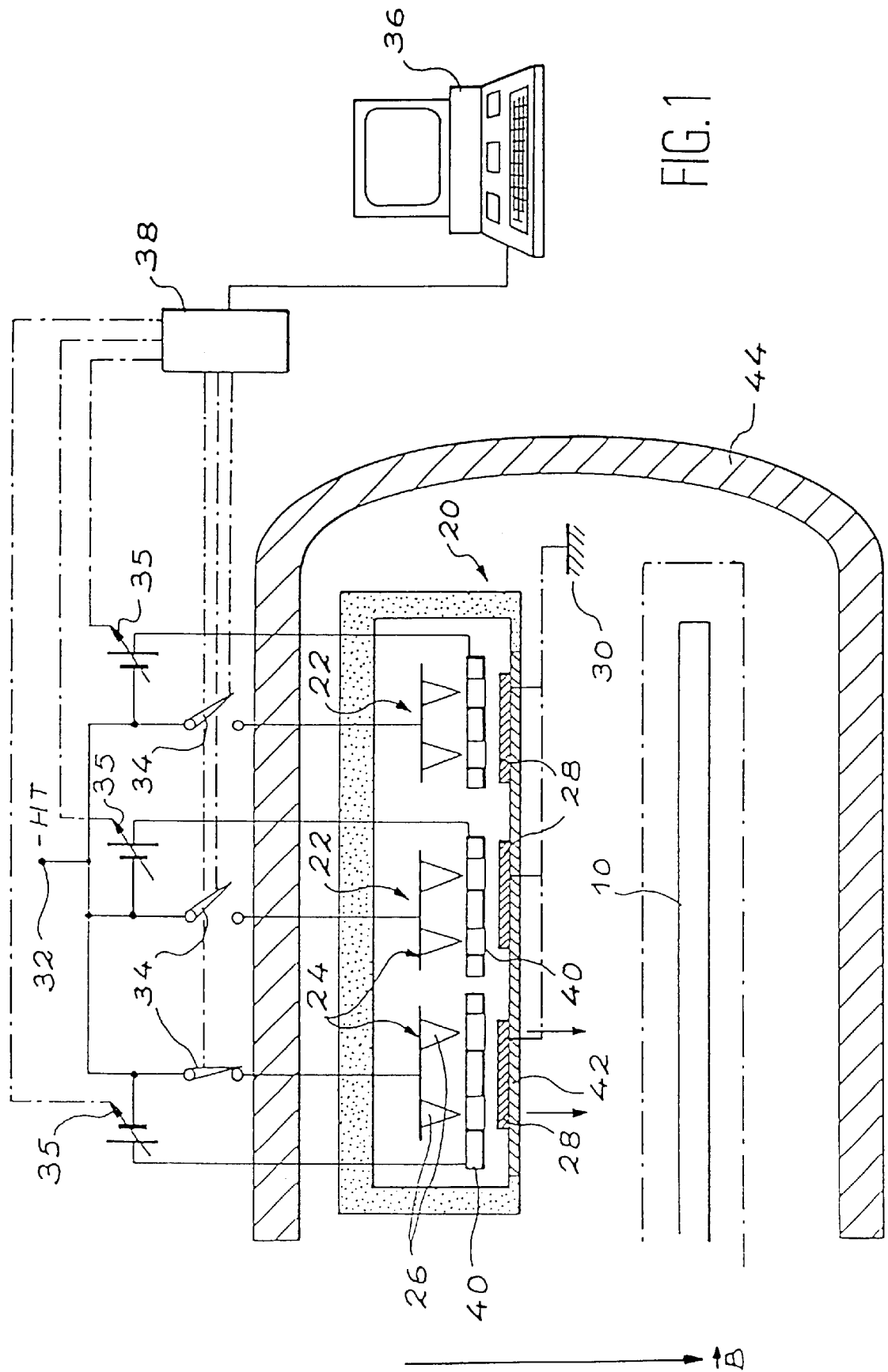
FIG. 1 is a partial diagrammatic section through a particular embodiment of an information recording system according to the invention.

FIG. 1 shows a very much enlarged view of a information recording device on a medium sensitive to X-rays such as a radiographic film 10.

The film 10 comprises a coating sensitive to X-radiation and is covered by a conversion material capable of transforming received X-rays into visible light that can make an impression on the coating.

The film 10, only part of which is visible, may be contained in a protective envelope 50 which, for simplification reasons, is shown very diagrammatically in chain-dotted lines. This type of envelope, preferably opaque to visible light and transparent to X-rays, will be described in more detail in the rest of this text.

The film 10 is placed under an X-ray tube 20 in a vacuum containing several point X-ray sources 22 laid out in a two-dimensional network. For example, the miniaturized sources 22 may be laid out in rows and columns to form a matrix of point sources.

For simplification reasons, FIG. 1 shows a tube with only three sources 22 laid out in line. However, this type of tube may contain a large number of miniaturized sources placed adjacent to each other to form a matrix of sources capable of printing an image formed of image elements, or pixels on a sensitive surface. Each source will be used to supply X-rays to print a corresponding pixel.

Each X-ray source 22 comprises a field emission cathode 24 equipped with one or several microtips 26 and an anode 28.

According to one variant, a common anode may be provided for several sources or for all sources.

The anode(s) 28 is (are) connected to a reference potential (0 volts) which in this case is the potential of the ground 30.

Cathodes 24 may be selectively connected to a negative high voltage source 32 through switches 34. Each cathode is equipped with a particular switch 34, for example made in the form of a transistor, which may be controlled by external control means consisting of a personal computer 36.

Switches are connected to the computer through galvanic isolation means 38, for example comprising optocouplers. The galvanic isolation means isolate the computer from the negative high voltage source 32. For example, the high voltage in source 32 may output a negative voltage −HT of the order of −10 kV to −30 kV.

FIG. 1 shows that the X-ray tube 20 also comprises grids 40 located between each cathode 24 and the corresponding anode. Each grid is polarized with respect to the high voltage potential with a positive voltage output by a corresponding controlled power supply 35.

Therefore, the potential of a grid polarized with a positive potential Vg is equal to −HT+Vg. The values of the grid polarization voltage may be continuous values or discrete values taken within a determined range to print on the film in different shades of gray. For example, the range may be between 40 volts and 100 volts. FIG. 1 shows that the controlled power supplies 35 are also controlled by the computer 36 to which they are connected through galvanic isolation means 38.

According to one variant, selective addressing in X-ray sources may consist of row and column addressing. In this case, the cross-addressed rows and columns may be associated with the cathodes and grids of the X-ray sources respectively. Switches placed at the top of rows and columns are used to selectively apply power supply voltages to the rows and columns at the intersection of which the X-ray sources to be activated are located.

According to one simplified variant, the sources may also be controlled by acting only on the corresponding grids which are then polarized according to two values of Vg corresponding to a state in which a source emits (Vg=+ 100V) and a state in which it does not emit (Vg<40V). Switches 34 are then superfluous.

An additional grid may be inserted between the electron sources and the anodes. The function of this grid is to prevent ions returning onto electron sources originating from the anode while the X-ray tube is in operation.

Application of a high voltage to a cathode causes the emission of electrons through microtips in the cathode. The electrons are accelerated under the effect of the electric field existing between the cathode and the anode, and bombard the anode material.

A vacuum is created inside tube 20 in order to enable a long free passage of electrons between the cathode and the anode. The tube may comprise a getter type element (not shown) to maintain a very low inside pressure.

For example, anodes may comprise a thin layer of tungsten (W), or possibly lightweight materials such as magnesium or aluminum capable of emitting X-rays in response to electron impacts.

Anodes 28 are placed on a window 42 in a material transparent to X-rays, for example such as beryllium.

The dimensions of anodes, and therefore of X-ray sources, is of the order of 10 $\mu$m in the plane of the window 42, and their thickness is a few micrometers.

Furthermore, the anodes and the window 42 are separated from the cathodes by a distance of the order of a few millimeters to about one centimeter and, as described above, are at a ground potential (0 volts).

Thus, particular electrical isolation measurements of the window 42 are not necessary.

The reference 44 denotes a magnet in the air gap in which the X-ray tube 20 and the film 10 are located. The magnet 44 creates a magnetic field denoted B, perpendicular to the plane of the cathodes (i.e. perpendicular to the plane of the film) and ensures that the impact of electrons on the anodes is limited to an area located facing the cathode from which the electrons are emitted. The magnetic field is chosen with a sufficient amplitude (for example from $10^{-2}$ to $10^{-1}$ Tesla) to prevent dispersion of electrons such that the area of the anode receiving the electrons and emitting X-rays is no larger than the cathode of the corresponding source.

Figure 2:
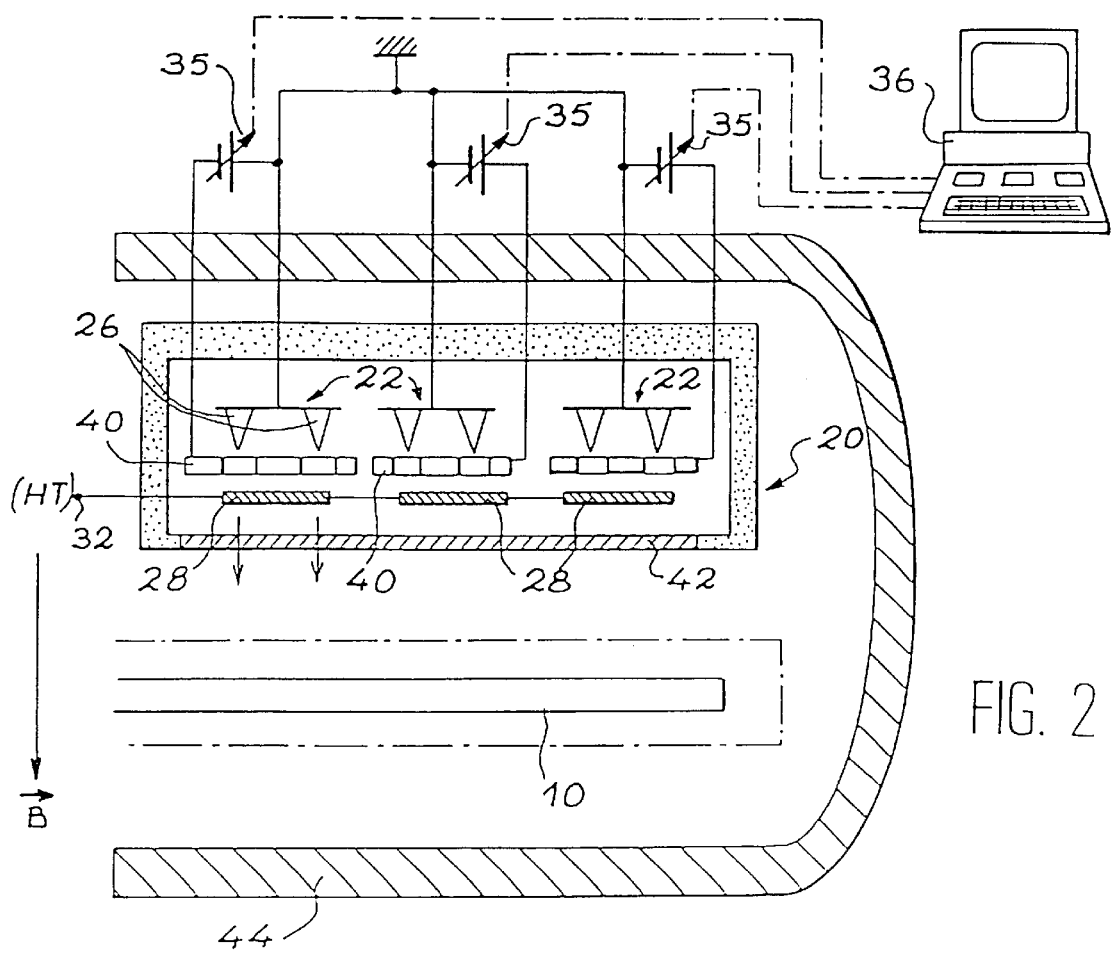
FIG. 2 is a partial diagrammatic section through another embodiment of an information recording system according to the invention. The embodiment in FIG. 2 is a variant of the embodiment in FIG. 1.

FIG. 2 shows an embodiment of a device comprising a variant of the device in FIG. 1. For simplification reasons, parts in FIG. 2 that are identical, similar or equivalent to parts in FIG. 1 are marked with the same references. Therefore, the above description is applicable to these parts.

The main difference between the device in FIGS. 1 and 2 is in the polarization of the cathodes and anodes.

In the device in FIG. 2, anodes 28 are connected to a high positive potential 32. The anodes 28 are not formed on the output window 42 as in FIG. 1, but are separated and electrically isolated to prevent the high positive voltage from appearing on window 42.

In this embodiment, as in the previous embodiment, all individual anodes 28 can be replaced by an anode common to all X-ray sources.

To generate electrons, grids 40 are polarized to be positive with respect to the cathodes by voltages Vg that may be varied continuously, or according to fixed values. These voltages are output by controlled power supplies 35.

If a voltage Vg is less than a given threshold, the emission from the corresponding cathode will be zero. This means that a cathode may be made to operate or not (in On/Off) in the same way as opening or closing a switch.

If Vg exceeds this threshold, the emission from the cathode, which is more or less intense (depending on the value of Vg) will lead to a more or less intense emission of X-rays and consequently a more or less pronounced insolation of the film.

Advantageously according to this embodiment, the controlled power supplies 35 do not need to be brought to a high potential. Consequently they can be connected directly to the computer 36 which operates at low voltage without the need for particular galvanic isolation means.

As for the previous embodiment described above, the sources may be addressed simultaneously or in sequence source after source, row after row or column after column to reproduce an image dot by dot (pixel by pixel) on the film. Image data or the information to be recorded may be stored in a computer memory.

The insolation time, in other words the X-ray emission time from each source, may be adjusted as a function of the transparency of the beryllium film that forms the window 42 of the X-ray tube, and as a function of the sensitivity of the film used.

In particular, the insolation time may be adjusted depending on whether the sensitive film is or is not equipped with a layer of light intensifying material.

Figure 3:
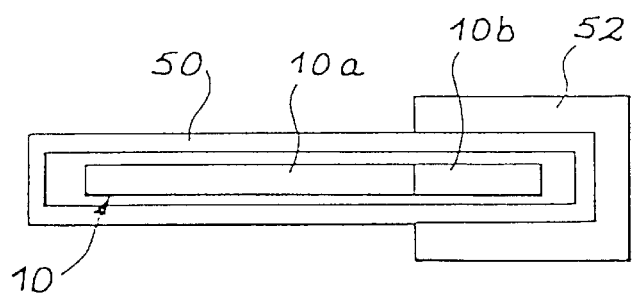
FIG. 3 is a diagrammatic section through an envelope in a system according to the invention, designed to contain a film sensitive to X-rays.

FIG. 3 shows a particular embodiment of an envelope that enables easy manipulation of the sensitive medium and capable of writing information with an excellent contrast. The use of this type of envelope is particularly suitable for applications of the invention to radiology.

The envelope is formed by a box 50 made of a material opaque to visible light and transparent to X-rays, for example such as a carbon sheet.

The envelope contains a sensitive medium that in the case shown in FIG. 3 is a radiographic film 10. The film comprises a first area 10a designed to record an radiography image and a second area 10b on which information contained in the computer file will be recorded.

It is observed that the housing is equipped with a removable cache 52 opaque to X-rays which can be put into position on the box 50 to cover part of a region corresponding to the second area 10b of the film. In the example shown, the cache 52 made of lead may be engaged sideways on box 50.

The envelope formed of the box 50 and possibly the cache 52 makes it possible to manipulate the film in complete safety without any risk of exposing it to visible light.

Furthermore, the film, with the envelope, may be put into place in a typical radiography instrument to form a radiographic image on the first area 10a of the film. When the film is exposed to X-rays to form the radiography image, part 10b is protected by the cache and will not be printed.

When information has been recorded on the film, which may take place before or after radiography, cache 52 is removed. A two-dimensional X-ray tube like that described above, is then placed adjacent to the housing 50 in the region corresponding to the area 10b of the film.

Since this area of the film is protected when the radiographic image is formed, information may be recorded with an improved contrast.

As described above, the system according to the invention can be used to enter information such as alphabetic or numeric characters, bar codes, icons or logos, or previously memorized images, in area 10b of the film.

What is claimed is:

1. A system for recording information on a medium sensitive to X-rays, comprising:

a set of adjacent X-ray sources, wherein the X-ray sources are microtip sources and means for selectively controlling the sources to print a selected pattern on the sensitive medium.

2. System according to claim 1, comprising a single dimensional or a two-dimensional network of point X-ray sources (22).

3. System according to claim 2, in which each X-ray source (22) comprises at least 1 source of electrons (24) with microtips (26), the electron source being associated with at least one anode (28) capable of emitting X-rays in response to impacts of electrons provided by electron sources.

4. System according to claim 3, in which the potential of the said anode (28) is increased to a positive high voltage and in which the control means comprise switches (34) associated with electron sources to selectively connect the microtips (26) of selected electron sources to a ground potential.

5. System according to claim 3, in which the said anode is connected to a ground potential and in which the control means comprise switches associated with electron sources to selectively connect the microtips of the selected electron sources to a high negative voltage.

6. System according to claim 3, in which the control means comprise extraction grids (40) associated with the corresponding electron sources, and controlled power supplies (35) to selectively polarize the extraction grids (40) with respect to the microtips in the corresponding electron sources.

7. System according to claim 4, in which the control means comprise a computer (26) connected to the switches (34) and/or power supplies (35).

8. System according to claim 7, in which the computer (36) is connected to switches and/or power supplies (35) through a galvanic isolation device (38).

9. System according to claim 1, in which the sensitive medium (10) is a radiologic film.

10. System according to claim 9, also comprising an envelope (50) opaque to visible light, capable of containing the radiologic film, and a cache (52) opaque to X-rays that can be adapted to the envelope to cover a region of the envelope corresponding to an area in which information will be recorded on a film during a radiographic exposure of the film, and which can be removed from the envelope to print the film in the said information recording area.

11. A two-dimensional network to record information on a medium sensitive to X-rays comprising:

a set of adjacent X-ray sources wherein the X-ray sources are microtip sources; and a controller which selectively controls the sources.

12. System according to claim 4, in which the control means comprise extraction grids (40) associated with the corresponding electron sources, and controlled power supplies (35) to selectively polarize the extraction grids (40) with respect to the microtips in the corresponding electron sources.

13. System according to claim 5, in which the control means comprise extraction grids (40) associated with the corresponding electron sources, and controlled power supplies (35) to selectively polarize the extraction grids (40) with respect to the microtips in the corresponding electron sources.

* * * * *